United States Patent
Narasimhan et al.

(10) Patent No.: US 9,461,943 B2
(45) Date of Patent: Oct. 4, 2016

(54) NETWORK ASSISTED VIRTUAL MACHINE MOBILITY

(75) Inventors: Hrishikesh Narasimhan, Sunnyvale, CA (US); Vipin Jain, San Jose, CA (US); Sukhesh Halemane, San Jose, CA (US); Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 13/612,012

(22) Filed: Sep. 12, 2012

(65) Prior Publication Data

US 2014/0075047 A1    Mar. 13, 2014

(51) Int. Cl.
| | |
|---|---|
| *G06F 15/16* | (2006.01) |
| *H04L 12/931* | (2013.01) |
| *G06F 11/20* | (2006.01) |
| *H04L 12/751* | (2013.01) |
| *H04L 12/24* | (2006.01) |
| *H04L 29/12* | (2006.01) |

(52) U.S. Cl.
CPC .......... *H04L 49/70* (2013.01); *G06F 11/203* (2013.01); *H04L 41/0813* (2013.01); *H04L 45/02* (2013.01); *H04L 61/103* (2013.01); *H04L 61/2076* (2013.01); *H04L 61/2084* (2013.01); *H04L 61/6009* (2013.01)

(58) Field of Classification Search
CPC ... G06F 15/173; G06F 11/203; G06F 9/5088
USPC .................................... 709/230, 224; 718/1
See application file for complete search history.

(56) References Cited

U.S. PATENT DOCUMENTS

| | | | | |
|---|---|---|---|---|
| 8,190,769 B1* | 5/2012 | Shukla | ............... | H04L 12/4625 709/211 |
| 2007/0183317 A1* | 8/2007 | Vasseur | ............... | H04J 3/14 370/225 |
| 2010/0165877 A1* | 7/2010 | Shukla | ............... | H04L 41/0843 370/254 |
| 2010/0287548 A1* | 11/2010 | Zhou | ............... | G06F 9/4856 718/1 |
| 2011/0075664 A1* | 3/2011 | Lambeth | ............... | H04L 45/04 370/390 |

(Continued)

OTHER PUBLICATIONS

Dunbar, et al. "BCP for ARP-ND Scaling for Large Data Centers," Internet Engineering Task Force (IETF), Jan. 3, 2012, pp. 1-12.

(Continued)

*Primary Examiner* — Aftab N. Khan
(74) *Attorney, Agent, or Firm* — Edell, Shapiro & Finnan, LLC

(57) ABSTRACT

A first addressing message is received at a first switch in a network fabric indicating that a first virtual machine has undergone migration from connection to a first virtual switch at a first server to connection to a second virtual switch at a second server. A route advertisement message is then transmitted from the first switch to at least a second switch in the network fabric. This route advertisement is configured to cause the second switch to transmit a second addressing message to a second virtual machine connected to the first virtual switch. The second addressing message provides the second virtual machine with updated addressing information for the first virtual machine. A third addressing message is also transmitted from the first switch to the first virtual machine to provide the first virtual machine with updated addressing information for the second virtual machine.

20 Claims, 5 Drawing Sheets

(56) References Cited

U.S. PATENT DOCUMENTS

| | | | | |
|---|---|---|---|---|
| 2011/0238820 A1* | 9/2011 | Matsuoka | ............ | G06F 9/5077 |
| | | | | 709/224 |
| 2012/0275328 A1* | 11/2012 | Iwata | ................. | H04L 12/4633 |
| | | | | 370/252 |
| 2013/0034015 A1* | 2/2013 | Jaiswal | .............. | H04L 12/4641 |
| | | | | 370/254 |
| 2013/0232492 A1* | 9/2013 | Wang | ................... | H04L 61/103 |
| | | | | 718/1 |
| 2013/0262647 A1* | 10/2013 | Kurita | ...................... | G06F 9/54 |
| | | | | 709/223 |
| 2013/0266019 A1* | 10/2013 | Qu | ........................ | H04L 49/70 |
| | | | | 370/395.53 |
| 2014/0013324 A1* | 1/2014 | Zhang | .................... | H04L 49/70 |
| | | | | 718/1 |
| 2014/0064104 A1* | 3/2014 | Nataraja | ............... | H04L 61/103 |
| | | | | 370/248 |
| 2014/0204937 A1* | 7/2014 | Matsuoka | ........... | H04L 12/4641 |
| | | | | 370/389 |
| 2014/0250220 A1* | 9/2014 | Kapadia | .............. | H04L 12/4625 |
| | | | | 709/224 |

OTHER PUBLICATIONS

Narten, et al., "Problem Statement for ARMD," Internet Engineering Task Force (IETF), Internet-Draft, Mar. 12, 2012, pp. 1-16.

McBride, et al., "Multicast in the Data Center Overview," Internet Engineering Task Force (IETF), Mar. 10, 2012, pp. 1-11.

"Address Resolution for Massive numbers of hosts in the Data center (armd)," http://datatracker.ietf.org/wg/armd/charter/, May 23, 2012, pp. 1-2.

* cited by examiner

NETWORK ASSISTED VIRTUAL MACHINE MOBILITY

TECHNICAL FIELD

The present disclosure relates to mobility of virtual machines (VMs) in a computing network.

BACKGROUND

The Address Resolution Protocol (ARP) is used to connect together the various networking layers within a computing network (e.g., to connect the Internet Protocol (IP) and Ethernet networking layers). Since networking hardware such as switches, hubs, routers, and bridges operate on, for example, Ethernet frames, these devices are unaware of the higher layer data carried by these frames. Similarly, IP layer devices, operating on IP packets, need to be able to transmit their IP data on the Ethernet layer. The ARP defines the mechanism by which IP capable hosts can exchange mappings of their Ethernet and IP addressing. The ARP is used primarily used in conjunction with IP Version 4 (IPv4).

More specifically, the ARP may be used to map IP addresses to a host address (i.e., a Media Access Control (MAC) address) that is recognized in the local network. For example, in IPv4, an IP address may be 32 bits long, but the Ethernet local area network (LAN) MAC addresses may be 48 bits long. A table, referred to herein as the ARP cache or ARP table, is used to maintain a correlation between each MAC address and its corresponding IP address.

The Neighbor Discovery Protocol (NDP) is another protocol in the Internet Protocol suite that is used in conjunction with Internet Protocol Version 6 (IPv6). The NDP is used for, among other tasks, discovery of other nodes and determined the addresses of the other nodes. In IPv6, the NDP is substantially the equivalent of the ARP used in IPv4.

DESCRIPTION OF EXAMPLE EMBODIMENTS

Overview

Techniques are provided herein for network-assisted updating of addressing information in a computing network upon migration of a virtual machine. In one example, a first addressing message is received at a first switch in a network fabric. This first message is transmitted from a first virtual machine that has undergone migration from a connection to a first virtual switch at a first server to a connection to a second virtual switch at a second server. A route advertisement message is then transmitted from the first switch to at least a second switch in the network fabric. This route advertisement is configured to cause the second switch to transmit a second addressing message to a second virtual machine connected to the first virtual switch. The second addressing message provides the second virtual machine with updated addressing information for the first virtual machine (i.e., the virtual machine that was previously in direct communication with the second virtual machine prior to migration to the new server). A third addressing message is also transmitted from the first switch to the first virtual machine to provide the first virtual machine with updated addressing information for the second virtual machine. These techniques may be embodied in a device/apparatus, a methodology and in computer readable storage media that stores instructions executed by a processor.

Example Embodiments

Figure 1:
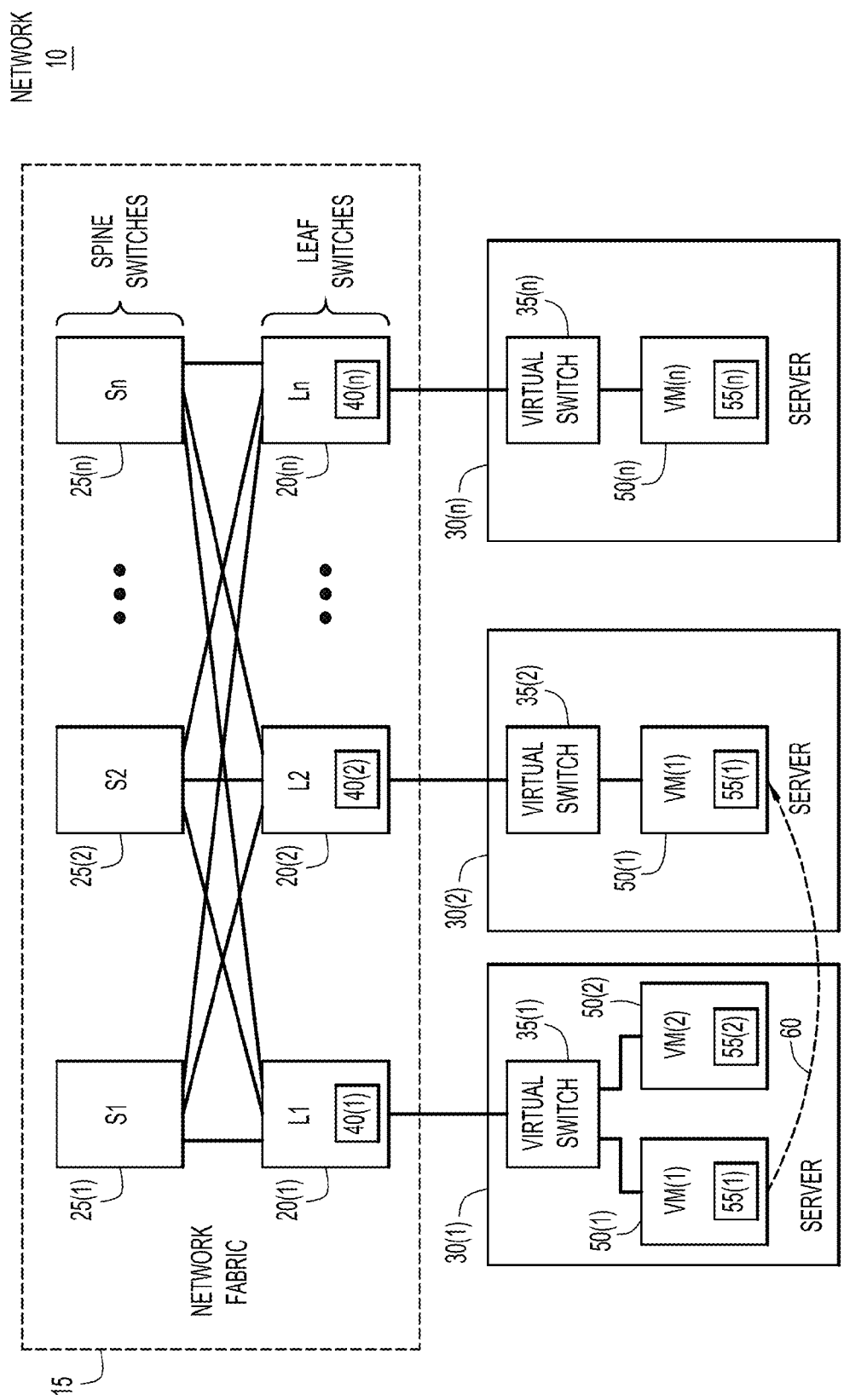
FIG. 1 is a schematic diagram of a computing network in which network devices are configured to selectively update the addressing information of one or more virtual machines.

FIG. 1 is a schematic diagram of a computing network 10 that includes a network fabric 15 having a set of interconnected nodes having a leaf and spine architecture. The network fabric 15 comprises a plurality of leaf switches 20(1)-20(n) and a plurality of spine switches 25(1)-25(n). Computing network 10 also comprises a plurality of computing devices (e.g., servers) 30(1)-30(n) that support virtual switches (vSwitches) 35(1)-35(n). The servers 30(1)-30(n) also support hosts in the form of virtual machines (VMs) 50(1)-50(n). In the example of FIG. 1, the leaf switches 20(1)-20(n) each include a selective Address Resolution Protocol (ARP) update module 40(1)-40(n), respectively. Additionally, virtual machines 50(1)-50(n) each include an ARP table 55(1)-55(n), respectively.

Computing network 10 may be, for example, an Internet Protocol (IP) local area network (LAN). In this example, the leaf switches 20(1)-20(n) are connected to respective servers 30(1)-30(n), and the spine switches 25(1)-25(n) connect together the leaf switches 20(1)-20(n). The leaf and spine architecture creates a low-latency, scalable network fabric. It is to be appreciated that the leaf and spine architecture of FIG. 1 is merely an example of a network architecture in which the techniques described herein may be implemented. In general, the disclosed techniques may be used to update addressing information in any computing network. For example, the network 10 need not be an IP network itself, but rather it is the encapsulated network connected thereto that provides the IP network connectivity to the virtual machines and the migration capability.

The virtual switches 35(1)-35(n) are fully virtual entities that can be connected to Network Interface Cards (NICs) of servers 30(1)-30(n). In practice, virtual switches 35(1)-35(n) enable the networking of virtual machines 50(1)-50(n).

The Internet Protocol (IP) suite is a set of communications protocols used for the Internet and similar networks. The IP suite is commonly known as TCP/IP, because of its most important protocols, namely the Transmission Control Protocol (TCP) and the Internet Protocol. TCP/IP provides end-to-end connectivity specifying how data should be formatted, addressed, transmitted, routed, and received at a destination. It has four abstraction layers, each with its own set of protocols. These layers include: (1) the link layer (commonly referred to as Ethernet) that includes the communication technologies for a local network; (2) the Internet layer (e.g., using IP) that connects the local networks, thus establishing internetworking; (3) the transport layer (e.g., using TCP) that handles host-to-host communication; and (4) the application layer that contains all protocols for specific data communications services on a process-to-process level.

The link layer is the networking scope of the local network to which a host (e.g., virtual machine) is attached. The link layer is used to move packets between the Internet layer interfaces of two different hosts on the same link. The Internet layer has the responsibility (potentially) of sending packets across multiple networks. Internetworking includes sending data from a source network to a destination network, referred to herein as routing. In the Internet Protocol suite, the IP performs two basic functions, namely host addressing and identification and packet routing.

A number of different versions of the Internet Protocol have been developed. In particular, Internet Protocol version 4 (IPv4) is the fourth revision in the development of the Internet Protocol (IP) and the first version of the protocol to be widely deployed. Together with Internet Protocol version 6 (IPv6), it is at the core of standards-based internetworking methods of the Internet. In accordance with examples described herein, a number of different protocols may be used for the network-assisted updating of addressing information. For example, the Address Resolution Protocol (ARP) may be used in networks implemented in accordance with IPv4, while the Neighbor Discovery Protocol (NDP) may be used in networks executed in accordance with IPv6. For ease of reference, the network-assisted updating techniques will be primarily described with reference to use of the ARP. However, it is to be appreciated that these techniques are also applicable to the NDP and other protocols typically used to distribute addressing information in a network.

In the example of FIG. 1, computing network is an IPv4 network and virtual machines (hosts) 50(1)-50(n) each have an assigned link layer address, commonly referred to as an Ethernet address, a Media Access Control (MAC) address, or a hardware address (collectively and generally referred to herein as MAC addresses). However, the Internet layer uses IP addresses (i.e., logical addresses assigned to hosts) for traffic routing. As such, the ARP is used to connect the link layer and provides a mechanism for converting between MAC addresses and IP addresses.

When the virtual machines (hosts) 50(1)-50(n) in IP network 10 initially communicate with each other, they perform an ARP resolution to cache their IP address to MAC address binding in local ARP tables 55(1)-55(n). This ARP information may then be distributed to all of the various nodes in computing network 10 using one or more conventional mechanisms. The virtual machines 50(1)-50(n) may subsequently use this information to communicate with one another. Virtual machines 50(1)-50(n) will not try to re-ARP (i.e., re-determine the ARP information of one or more other virtual machines) until the specific ARP entries in the local tables time out.

As shown, the servers 30(1)-30(n) each support at least one virtual switch 35(1)-35(n) that connect the leaf switches 20(1)-20(n) to one or more virtual machines 50(1)-50(n) also supported by the servers 30(1)-30(n). Applications have been developed that allow the migration of virtual machines, such as virtual machines 50(1)-50(n), from one physical server to another. This migration is sometimes referred to herein as "virtual motion" of the virtual machines. FIG. 1 illustrates an example in which virtual machine 50(1) undergoes migration from server 30(1) to server 30(2). This migration is illustrated in FIG. 1 by arrow 60. Migration of a virtual machine is advantageous because, for example, it allows users to proactively move virtual machines away from failing or underperforming servers, automatically optimize and allocate pools of resources for optimal hardware utilization, etc.

Prior to migration of virtual machine 50(1) from server 30(1) to server 30(2), virtual machines 50(1) and 50(2) communicate directly with one another via virtual switch 35(1) (i.e., virtual machines 50(1) and 50(2) can address packets directly to the MAC address of the other virtual machine for forwarding via virtual switch 35(1)). However, when virtual machines 50(1) and 50(2) communicate with virtual machines outside the subnet, the virtual machines 50(1) and 50(2) address the packets to a routing MAC address designated for the network fabric 15. In other words, virtual machines 50(1) and 50(2) address packets to a MAC address that causes the virtual switch 35(1) to forward the packet to leaf switch 20(1). Leaf switch 20(1) will engage in proxy ARP operations and then responds back to the initiating virtual machine. Proxy ARP is a feature supported by network nodes that allows the nodes to respond to ARP requests from virtual machines on behalf of other virtual machines or other hosts outside the subnet. In essence, the network node pretends to be the host outside the subnet and will perform forwarding when it receives the packets from the initiating virtual machine.

A problem arises when, as shown in FIG. 1, virtual machine 50(1) migrates to server 30(2) so as to be connected to a different virtual switch 35(2). When virtual machine 50(1) migrates to the new server, the ARP tables 55(1) and 55(2) of virtual machines 50(1) and 50(2), respectively, will no longer include the correct addressing information needed for communication between the virtual machines because they can no longer directly address packets to the other's MAC address.

There are, in general, two addressing problems that occur when a virtual machine migrates to a new server. The first problem is that the migrated virtual machine (virtual machine 50(1) in FIG. 1) continues to believe that it should address packets directly to the MAC address of virtual machine 50(2) (i.e., it believes communication may still directly occur via virtual switch 35(1)). However, as a result of the migration, virtual machines 50(1) and 50(2) are no longer directly connected to virtual switch 35(1)) and this direct communication is not possible. As such, the ARP table 55(1) of virtual machine 50(1) needs to be updated with a new MAC address that may be used to reach virtual machine 50(2).

The second problem is that virtual machine 50(2) similarly continues to believe that it should address packets directly to the MAC address of virtual machine 50(1) (i.e., it believes communication may still directly occur via virtual switch 35(1)). However, since this is no longer possible, the ARP table 55(2) of virtual machine 50(2) needs to be updated with a new MAC address that may be used to reach virtual machine 50(1).

Figure 2:
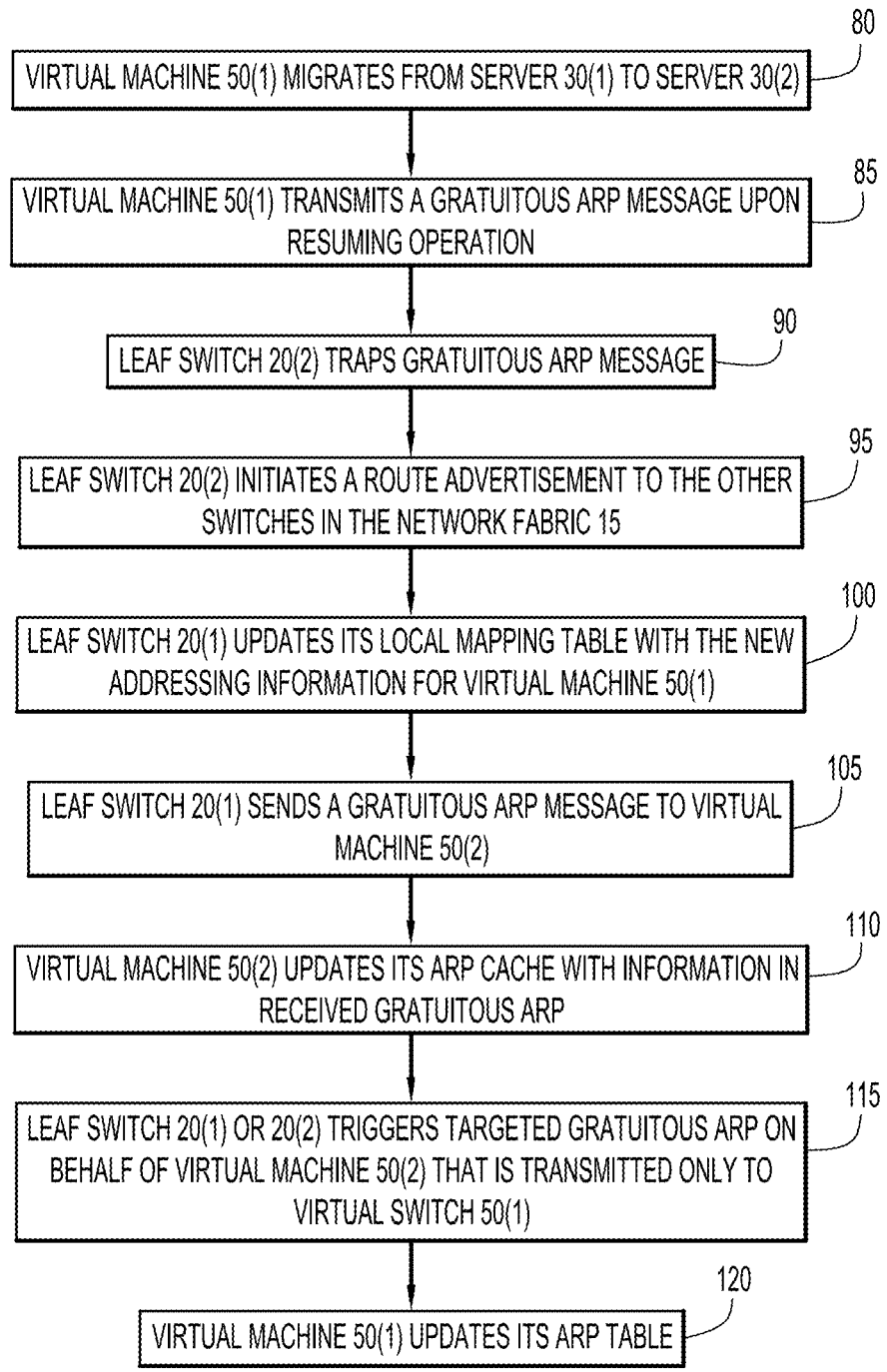
FIG. 2 is a detailed flowchart illustrating a method executed in accordance with examples described herein.
Figure 3:
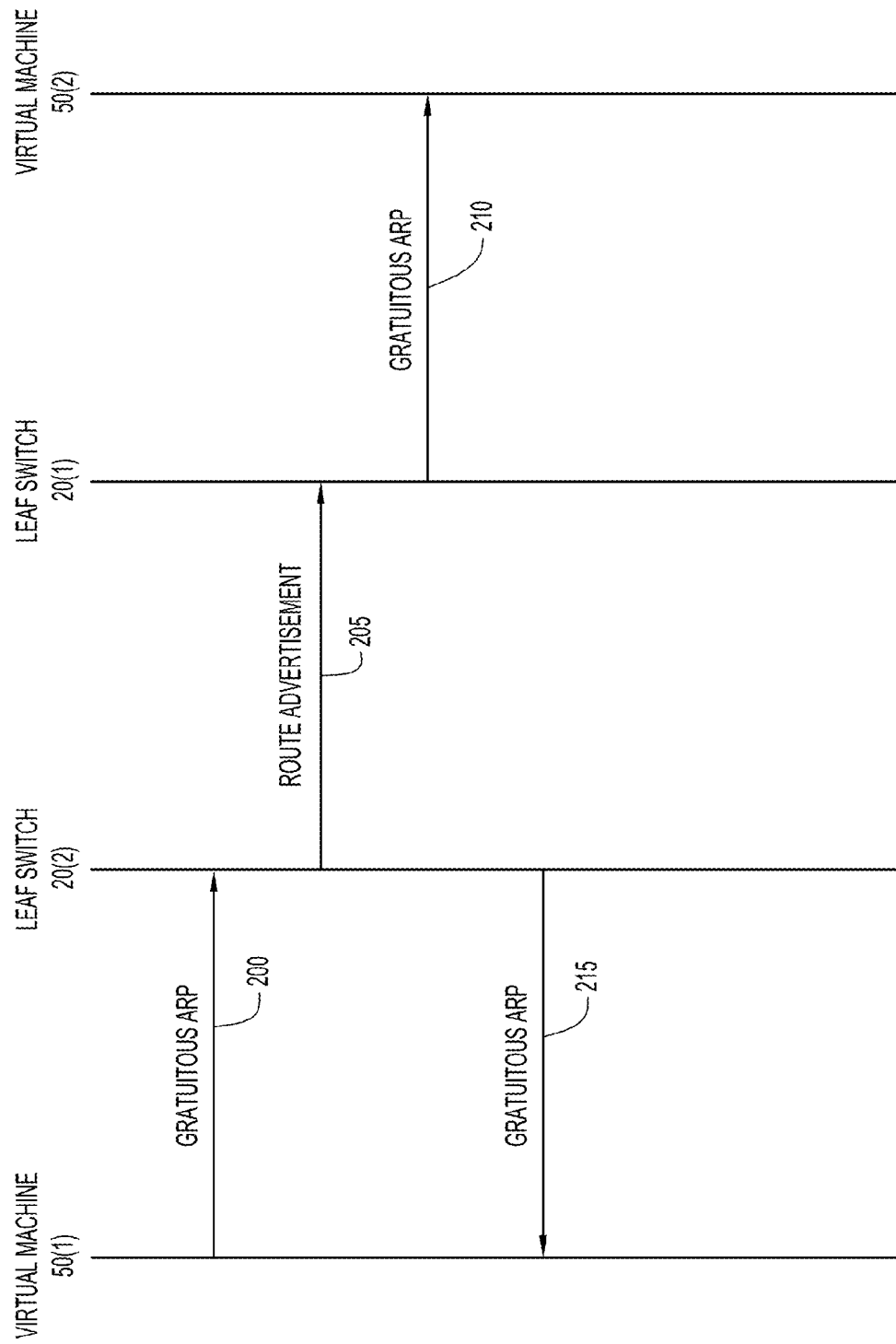
FIG. 3 is a schematic flow diagram illustrating the exchange of messages in accordance with the example of FIG. 2.

In certain conventional arrangements, the migration of a virtual machine results in undesirable flooding or transmission of new addressing information to a large number of other nodes. Alternatively, communication between virtual machines 50(1) and 50(2) may be impossible until ARP information ages out and is refreshed through corresponding re-ARP procedures. Described herein are new techniques that eliminate the undesirable need to transmit the addressing information for the migrated virtual machine to a large number of nodes or to wait for the ARP entry time-outs resulting in re-ARP procedures. Instead, the network-assisted update techniques described herein provide a mechanism in which, after completion of the migration, the updated addressing information is provided only to concerned nodes. FIG. 2 is a detailed flowchart illustrating the network-assisted updating of addressing information in accordance with examples described herein. FIG. 3 is a flow diagram that schematically illustrates messages exchanged in the network-assisted update techniques of FIG. 2. The examples of FIGS. 2 and 3 will be described with reference to the network architecture of FIG. 1 and the ARP. As noted, the described techniques may also be implemented in conjunction with other network architectures and other network protocols (e.g., NDP).

The example of FIG. 2 begins at 80 where virtual machine 50(1) undergoes migration from server 30(1) to server 30(2). At 85, after virtual machine 50(1) resumes operation, a first ARP message is transmitted to leaf switch 20(2. In this example, the first ARP message is a gratuitous ARP message and is represented by arrow 200 in FIG. 3. The first ARP message may be, in other examples, a reverse ARP message.

In general, the computing network 10 receives the ARP message from one of the connected entities, such as a virtual machine, virtual switch, or a server. For example, in one implementation, upon migration of virtual machine 50(1), the ARP message may be sent by new server 30(2). However, in some Linux implementations it may be possible to get assistance for virtual machine 50(1) to send the ARP message.

The gratuitous ARP message is an announcement that is transmitted in order to update other hosts' mapping when the sender's IP address or MAC address has changed. In conventional arrangements, this announcement is usually broadcast to the other nodes in the network. However, it is undesirable for this change in MAC address to be transmitted to all other virtual machines in the network since a majority of the other machines do not need new addressing information for virtual machine 50(1). In particular, as noted above, when packets need to be sent across a leaf switch, the packets are addressed to a common routing MAC address. Therefore, any virtual machine that was not in the same original subnet as virtual machine 50(1) can continue to use the routing MAC address to reach virtual machine 50(1).

Therefore, at 90 the gratuitous ARP message is trapped by leaf switch 20(2) connected to virtual switch 35(2) and thus not forwarded on to other nodes. The leaf switch 20(2) is configured to interpret the receipt of this gratuitous ARP message as a signal to initiate or start the selective ARP information update technique. Therefore, at 95 the leaf switch 20(2) initiates a route advertisement to the other switches in the network fabric 15. This route advertisement includes information sufficient enough for the previous leaf switch 20(1) (where virtual machine 50(1) moved from) to uniquely identify the identity of virtual machine 50(1). This may include, for example, the host's network identification (e.g., IP address or a MAC address), network context of the host identification, such as a VRF (Virtual Routing Forwarding) for IP address, or layer2 domain identifier such as VLAN-ID or equivalent, and/or other identification (e.g., IP address, or TRILL bridge id) of the leaf node where the virtual machine moved. The route advertisement is represented in FIG. 3 by arrow 205.

Upon receipt of this route advertisement, at 100 the leaf switch 20(1) that virtual machine 50(1) was previously connected to (via virtual switch 35(1)) updates its local mapping table with the new addressing information for virtual machine 50(1). Additionally, when this route advertisement is received by leaf switch 20(1), the leaf switch is configured to determine that the ARP caches of all virtual machines connected thereto need to be updated before communication between those virtual machines and virtual machine 50(1) is possible. Therefore, at 105, leaf switch 20(1) sends a gratuitous ARP message (on behalf of virtual machine 50(1)) to only virtual machine 50(2). This gratuitous ARP message includes the IP address for virtual machine 50(1) and the router MAC address as proxy, since the packets now are to be transmitted across the switch fabric. This gratuitous ARP message is represented in FIG. 3 by arrow 210. At 110, virtual machine 50(2) updates its ARP cache with this information, thus resulting in virtual machine 50(2) having the addressing information for virtual switch 50(1) so as to be able to transmit packets thereto.

Similarly, virtual machine 50(1) also needs to update the ARP entries in its ARP table so that it has the information need to reach virtual machine 50(2). This is achieved by, at 115, triggering a gratuitous ARP on behalf of virtual machine 50(2) so that virtual machine 50(1) can update its ARP table with the correct information. That is, the ARP table of virtual machine 50(1) is updated so that virtual machine 50(1), when trying to communicate with virtual machine 50(2), will send packets to the MAC address of leaf switch 20(2) (i.e., the routing MAC address) rather than to the MAC address of virtual machine 50(2). As shown by arrow 215 in FIG. 3, leaf switch 20(2) or leaf switch 20(1) triggers the gratuitous ARP and it is transmitted only to virtual switch 50(1). The notification from leaf switch 20(1) or leaf switch 20(2) is performed based on the virtual machines on the same hypervisor, which in this case are virtual machines 50(1) and 50(2). This gratuitous ARP indicates that the MAC address for reaching virtual machine 50(2) (from virtual machine 50(1)) is the MAC address of leaf switch 20(2) (i.e., the routing MAC address). This results in virtual machine 50(1) updating its ARP table at 120.

The update of the ARP caches at virtual machines 50(1) and 50(2) enables continued communication between the two hosts without the need for network flooding or waiting for ARP entries to time out. Because this uses a selective or targeted distribution of the ARP information, the network remains scalable.

It is to be appreciated that the update of the ARP caches at virtual machines 50(1) and 50(2) could be executed in an order that is different than that shown in FIGS. 2 and 3. For example, the ARP table 55(1) of virtual switch 50(1) may be updated prior to the ARP table 55(2) of virtual switch 50(2). Alternatively, the two ARP tables may be updated substantially simultaneously with both updates triggered by the initial gratuitous ARP message from virtual switch 50(1).

It is to be appreciated that the ARP tables of virtual machines not connected to virtual switches 35(1) or 35(2), such as the ARP table 55(N) of virtual machine 50(n), need not be updated as a result of the migration of virtual machine 50(1). There is no need to update these ARP tables because these virtual machines were already communicating with both virtual machines 50(1) and 50(2) across a leaf switch. As explained above, when communicating across a leaf switch, the virtual machines use the routing MAC address and are, accordingly, still able to communicate with the migrated virtual machine 50(1) in the same manner as prior to migration (i.e., by sending packets to the routing MAC address for subsequent forwarding by the network fabric 15).

Figure 4:
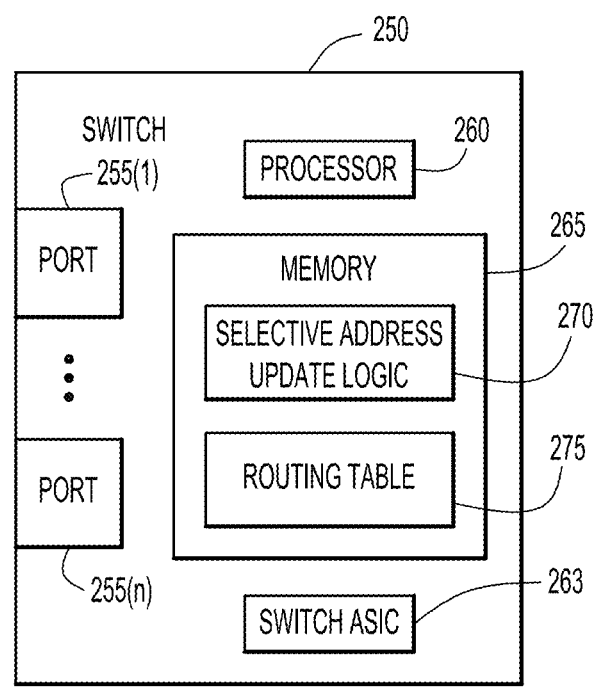
FIG. 4 is a block diagram of a leaf switch configured to selectively update the addressing information of one or more virtual machines.

FIG. 4 is a functional block diagram of a leaf switch 250 configured to execute a portion of a network-assisted update technique in accordance with aspects described herein. As shown, switch 250 comprises a plurality of ports 255(1)-255(n), a processor 260, a switch application specific integrated circuit (ASIC) 263 and a memory 265. The switch ASIC 263 is a hardware device that performs the various queuing, hashing and other networking switching operations. Memory 265 stores instructions for one or more software modules including selective ARP update logic 270 and a routing table 275. Memory 265 may comprise read only memory (ROM), random access memory (RAM), magnetic disk storage media devices, optical storage media devices, flash memory devices, electrical, optical, or other physical/tangible (e.g., non-transitory) memory storage devices. The processor 260 is, for example, a microprocessor or microcontroller that executes instructions for the selective address update logic 270. Thus, in general, the memory 265 may comprise one or more tangible computer readable storage media (e.g., a memory device) encoded with software comprising computer executable instructions and when the software is executed (by the processor 260) it is operable to perform the operations described herein for execution of the network-assisted update techniques.

Figure 5:
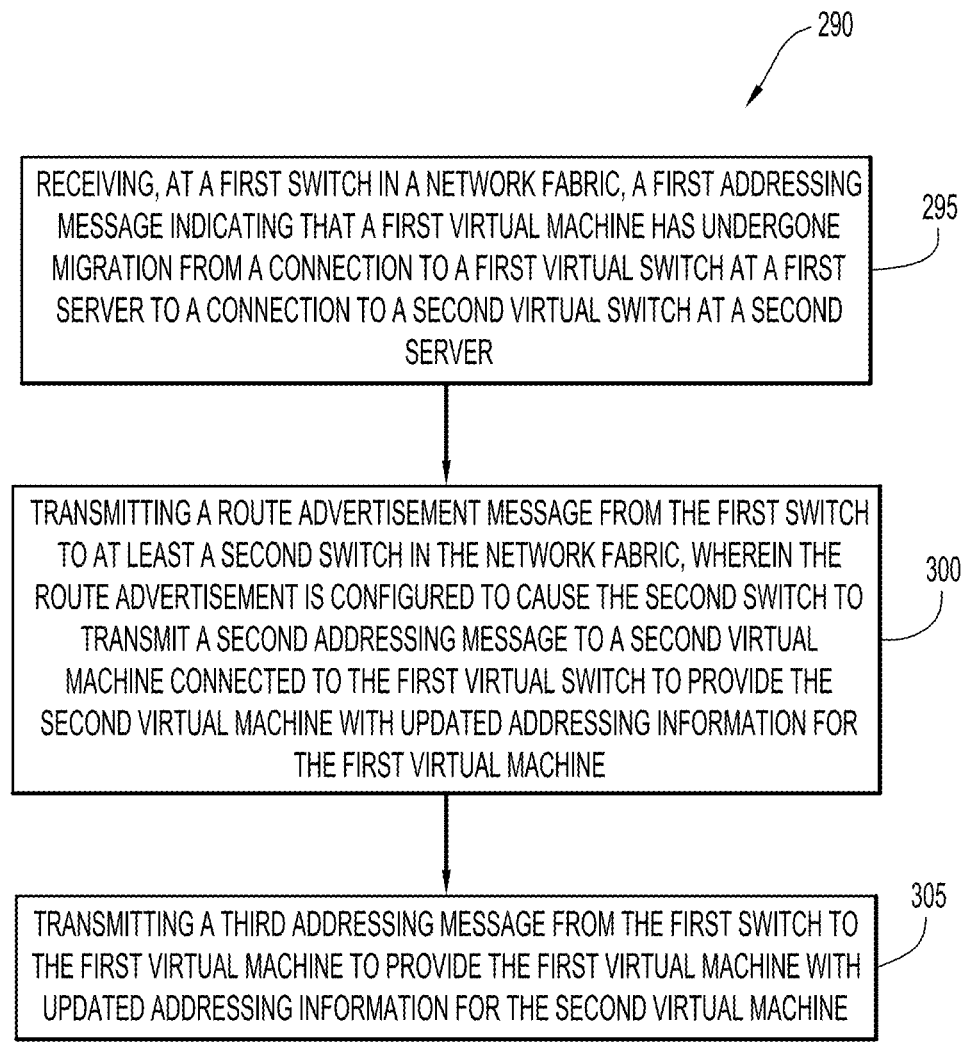
FIG. 5 is a high-level flowchart of a method executed in accordance with examples described herein.

FIG. 5 is a flowchart illustrating an example method 290 executed in accordance with the network-assisted update techniques described herein. Method 290 begins at 295 where a first switch in a network fabric receives a first addressing message indicating that a first virtual machine has undergone migration from a connection to a first virtual switch at a first server to a connection to a second virtual switch at a second server. This first addressing message may be, for example, a gratuitous ARP message, a reverse ARP message, an NDP message, etc. At 300, a route advertisement message is transmitted from the first switch to at least a second switch in the network fabric. The route advertisement is configured to cause the second switch to transmit a second addressing message to a second virtual machine connected to the first virtual switch to provide the second virtual machine with updated addressing information for the first virtual machine. At 310, a third addressing message is transmitted from the first switch to the first virtual machine to provide the first virtual machine with updated addressing information for the second virtual machine.

Upon migration of virtual machines in large data center networks, the migrated host is triggers addressing messages (e.g., gratuitous ARPs) toward the other hosts to inform the other hosts of the new location. This is achieved, in conventional arrangements, through network assists, which result in the addressing tables being refreshed on a large number of network connected hosts. The network-assisted update techniques described herein synchronize the addressing information across the network so as to correct/update the addressing tables of only the hosts that were affected by the migration of a virtual machine. In the environments described above, the network-assisted update techniques quick provide affected hosts with updated addressing information, without flooding and without potential black holing traffic until addressing information ages out and is subsequently refreshed.

The above description is intended by way of example only.

What is claimed is:

1. A method comprising:
receiving, at a first switch in a network fabric formed by a plurality of interconnected switches, a first broadcast addressing message sent by a first virtual machine that has undergone migration from a first subnet associated with a first virtual switch at a first server to a second subnet associated with a second virtual switch at a second server;
trapping the first broadcast addressing message at the first switch to prevent the first broadcast addressing message from passing to other switches in the network fabric;
generating, based on the trapped first broadcast addressing message, a unicast route advertisement message that is sent from the first switch to at least a second switch in the network fabric, wherein the route advertisement message includes information identifying the first virtual machine;
at the second switch, determining, based on information in the unicast route advertisement message, that the first virtual machine was previously part of the first subnet;
in response to the determining, generating a second addressing message that is unicast to only virtual machines within the first subnet to provide the virtual machines within the first subnet with updated addressing information for the first virtual machine, wherein the second addressing message informs the virtual machines within the first subnet that the first virtual machine is reachable via a routing Media Access Control (MAC) address associated with the plurality of interconnected switches forming the network fabric; and
generating a third addressing message that is unicast from the first switch to only the first virtual machine to provide the first virtual machine with updated addressing information for the virtual machines within the first subnet.

2. The method of claim 1, wherein the plurality of interconnected switches forming the network fabric are connected in a leaf and spine architecture.

3. The method of claim 1, wherein the third addressing message informs the first virtual machine that the virtual machines connected to the first virtual switch are reachable via the routing MAC address of the network fabric.

4. The method of claim 1, further comprising:
in response to receiving the route advertisement message, updating a local mapping table at the second switch with new addressing information for the first virtual machine.

5. The method of claim 1, wherein receiving the first addressing message comprises:
receiving a first gratuitous Address Resolution Protocol (ARP) message, and wherein the second and third addressing messages comprise second and third ARP messages, respectively.

6. The method of claim 1, wherein receiving the first addressing message comprises:
receiving a first reverse ARP message, and wherein the second and third addressing messages comprise second and third ARP messages, respectively.

7. The method of claim 1, wherein receiving the first addressing message comprises:
receiving a first Network Discovery Protocol (NDP) message, and wherein the second and third addressing messages comprise second and third gratuitous ARP messages, respectively.

8. One or more non-transitory computer readable storage media encoded with software comprising computer executable instructions and when the software is executed operable to:
receive, at a first switch in a network fabric formed by a plurality of interconnected switches, a first broadcast addressing message sent by a first virtual machine that has undergone migration from a first subnet associated with a first virtual switch at a first server to a second subnet associated with a second virtual switch at a second server;

trap the first broadcast addressing message at the first switch to prevent the first broadcast addressing message from passing to other switches in the network fabric;

generate, based on the trapped first broadcast addressing message, a unicast route advertisement message that is sent from the first switch to at least a second switch in the network fabric, wherein the unicast route advertisement message includes information identifying the first virtual machine so that the second switch is able to determine that the first virtual machine was previously part of the first subnet, and wherein the unicast route advertisement message is configured to cause the second switch to send a second addressing message to only virtual machines within the first subnet to provide the virtual machines within the first subnet with updated addressing information for the first virtual machine, wherein the second addressing message informs the virtual machines within the first subnet that the first virtual machine is reachable via a routing Media Access Control (MAC) address associated with the plurality of interconnected switches forming the network fabric; and send a unicast third addressing message from the first switch to only the first virtual machine to provide the first virtual machine with updated addressing information for the virtual machines within the first subnet.

9. The non-transitory computer readable storage media of claim 8, wherein the plurality of interconnected switches forming the network fabric are connected in a leaf and spine architecture.

10. The non-transitory computer readable storage media of claim 8, wherein the instructions operable to send the third addressing message from the first switch to the first virtual machine comprise instructions operable to:

send the third addressing message from the first switch to only the first virtual machine on behalf of the virtual machines within the first subnet, wherein the third addressing message informs the first virtual machine that the virtual machines within the first subnet are reachable via the routing MAC address of the network fabric.

11. The non-transitory computer readable storage media of claim 8, wherein the route advertisement message is configured to cause the second switch to update a local mapping table with new addressing information for the first virtual machine.

12. The non-transitory computer readable storage media of claim 8, wherein the instructions operable to receive the first addressing message comprise instructions operable to:
receive a first gratuitous Address Resolution Protocol (ARP) message, and wherein the second and third addressing messages comprise second and third ARP messages, respectively.

13. The non-transitory computer readable storage media of claim 8, wherein the instructions operable to receive the first addressing message comprise instructions operable to:
receive a first reverse ARP message, and wherein the second and third addressing messages comprise second and third ARP messages, respectively.

14. The non-transitory computer readable storage media of claim 8, wherein the instructions operable to receive the first addressing message comprise instructions operable to:
receive a first Network Discovery Protocol (NDP) message, and wherein the second and third addressing messages comprise second and third gratuitous ARP messages, respectively.

15. An apparatus comprising:

a plurality of network ports for communication on a network fabric formed by a plurality of interconnected switches;

a memory configured to store selective address update logic; and a processor configured to execute the selective address update logic to:

receive a first broadcast addressing message sent by a first virtual machine that has undergone migration from a connection to a first virtual switch at a first server to a connection to a second virtual switch at a second server, trap the first broadcast addressing message to prevent the first broadcast addressing message from passing to other switches in the network fabric;

generate, based on the trapped first broadcast addressing message, a unicast route advertisement message that is sent to at least a first switch in a network fabric, wherein the route advertisement message includes information identifying the first virtual machine so that the first switch is able to determine, based on information in the route advertisement, that the first virtual machine was previously connected to the first switch via the first virtual switch and to cause the first switch to send a second addressing message from the first switch to only virtual machines connected to the first virtual switch to provide the virtual machines connected to the first virtual switch with updated addressing information for the first virtual machine, wherein the second addressing message informs the virtual machines connected to the first virtual switch that the first virtual machine is reachable via a routing Media Access Control (MAC) address associated with the plurality of interconnected switches forming the network fabric, and send a unicast third addressing message to only the first virtual machine to provide the first virtual machine with updated addressing information for the virtual machines connected to the first virtual switch.

16. The apparatus of claim 15, wherein the plurality of interconnected switches forming the network fabric are connected in a leaf and spine architecture.

17. The apparatus of claim 15, wherein the processor is configured to send the third gratuitous addressing to only the first virtual machine on behalf of the virtual machines connected to the first virtual switch, wherein the third addressing message informs the first virtual machine that the virtual machines connected to the first virtual switch are reachable via the routing MAC address of the network fabric.

18. The apparatus of claim 15, wherein to receive the first addressing message the processor is configured to:
receive a first gratuitous Address Resolution Protocol (ARP) message, and wherein the second and third addressing messages comprise second and third ARP messages, respectively.

19. The apparatus of claim 15, wherein to receive the first addressing message the processor is configured to:
receive a first reverse ARP message, and wherein the second and third addressing messages comprise second and third ARP messages, respectively.

20. The apparatus of claim 15, wherein to receive the first addressing message the processor is configured to:
   receive a first Network Discovery Protocol (NDP) message, and wherein the second and third addressing messages comprise second and third gratuitous ARP messages, respectively.

* * * * *